United States Patent [19]

Beacom et al.

[11] Patent Number: 4,996,660

[45] Date of Patent: Feb. 26, 1991

[54] SELECTION OF DIVISOR MULTIPLIERS IN A FLOATING POINT DIVIDE CIRCUIT

[75] Inventors: Thomas J. Beacom, Pine Island; Donald L. Freerksen, Rochester, both of Minn.

[73] Assignee: International Business Machines Corporation, Armonk, N.Y.

[21] Appl. No.: 339,268

[22] Filed: Apr. 17, 1989

[51] Int. Cl.[5] ............................................. G06F 7/38
[52] U.S. Cl. ..................................... 364/748; 364/761
[58] Field of Search ............... 364/748, 761, 764, 766, 364/767

[56] References Cited

U.S. PATENT DOCUMENTS

| | | | |
|---|---|---|---|
| 4,320,464 | 3/1982 | Desmonds | 364/766 |
| 4,722,069 | 1/1988 | Ikeda | 364/767 |
| 4,724,529 | 2/1988 | Irukulla et al. | 364/761 |

FOREIGN PATENT DOCUMENTS

56-123038 9/1981 Japan .................................. 364/761

OTHER PUBLICATIONS

Lemaire et al., "*Improved Non-Restoring Division*"IBM Tech. Discl. Bull. vol. 23, No. 3, Aug. 1980, pp. 1149-1151.

Basu et al., "*On a Simple Post Correction for Non-Restoring Division*" IEEE Trans. on Computers, Oct. 1975, pp. 1019-1020.

Sanyol, "An Algorithm for Non-Restoring Division" Computer Design, May 1977, pp. 124-125.

*Primary Examiner*—Dale M. Shaw
*Assistant Examiner*—Tan V. Mai
*Attorney, Agent, or Firm*—Paul L. Sjoquist

[57] ABSTRACT

A multiple selector logic circuit for selecting divisor multiples in 2-bit, non-restoring divide sequences, which provides a proper and accurate quotient result and remainder, and which produces rounding and indication of exact or inexact result in conformance with ANSI/IEEE Standard 754-1985; the multiple selector logic circuit incorporates semiconductor circuits including a multiplier table having a particular matrix of multipliers which meet the standard.

4 Claims, 4 Drawing Sheets

SELECTION OF DIVISOR MULTIPLIERS IN A FLOATING POINT DIVIDE CIRCUIT

BACKGROUND OF THE INVENTION

The present invention relates to a method and apparatus for performing the floating point arithmetic operation of dividing in a data processing system. More particularly, the invention relates to an apparatus for implementing the method of 2-bit non-restoring division through a number of iterations, to produce a quotient from a floating point division circuit, and wherein the divide algorithm uses multiples of the divisor during these iterations. The present invention is specifically related to the selection of the particular multipliers to be used during each iteration of the divide operation.

The use of floating point arithmetic operations in a data processing system has been a common practice practically since the inception of computer technology. The development of floating point arithmetic hardware has taken many forms, usually with the objectives of simplifying the hardware construction, or enhancing the speed of the arithmetic processing operation. The four arithmetic operations of add, subtract, multiply and divide have usually been accomplished by using specialized subsets of processes involving addition and subtraction. For example, multiplication operations have in many cases been performed by repeated addition processes, and division has been accomplished by a process of repeated subtraction. The efforts made to speed up these processing operations have focused on enhancements and simplifications of hardware circuit design, particularly the adder circuit, which ultimately limits the maximum processing speed of all arithmetic operations. In the case of division, efforts have been made to increase the speed of operation by calculating partial quotients, or by simultaneously predicting multiple quotient bits, to reduce the number of addition or subtraction iterations required for the divide calculation.

Unfortunately, any arithmetic circuit utilizing an adder for carrying out an addition or subtraction inevitably involves the generation of carry bits which are propagated from least significant bit positions to more significant bit positions, and can in fact be propagated throughout all bit positions during an arithmetic operation. This has the affect of extending the processing time required for completing a calculation, and various design efforts have been made to deal with this problem. For example, U.S. Pat. No. 4,754,422, issued June 28, 1988, discloses a dividing apparatus utilizing three carry-save adders in an effort to produce a plurality of quotient bits during each iteration or cycle of arithmetic operation. U.S. Pat. No. 3,621,218, issued Nov. 16, 1971, discloses a high-speed divider utilizing a single carry-save adder for producing a plurality of quotient bits during each iteration of the arithmetic operation, and a plurality of registers for holding a sequence of partial quotients used in the operation.

IBM Technical Disclosure Bulletin, Volume 14, No. 11, April 1972 (pages 3279-3281) discloses a divider for producing two quotient bits per iteration, utilizing two carry-save adders and certain multiples of the divisor to speed up the operation.

An American National Standard has been developed, known as "IEEE Standard For Binary Floating Point Arithmetic", ANSI/IEEE Standard No. 754-1985. This standard sets forth the definitions, formats, and rules for performing certain floating point operations, including rules for dealing with the treatment of the results of floating point arithmetic operations. Among these rules, the standard requires the setting of a flag called "inexact result" if the result of a floating point arithmetic operation is not equal to the result that would have been produced if the calculation had been made to infinite precision. The standard also defines several different rules for performing rounding of arithmetic results when necessary.

The design of floating point arithmetic circuits and algorithms is strongly influenced by the provisions of ANSI/IEEE Standard No. 754-1985. It is desirable to design such circuits and algorithms to produce results which comply with all of the provisions of this standard, under all conditions of operation. For example IBM Technical Disclosure Bulletin, Vol. 30, No. 7, December 1987 (pages 276-278) discloses a method for producing an exact remainder, as defined in the standard, wherein the method is independent of the size of the argument. However, the paper does not specifically deal with the detection of an exact or inexact result, and therefore does not entirely respond to the requirement of the IEEE standard.

U.S. Pat. No. 3,852,581, issued Dec. 3, 1974, discloses a method and apparatus for performing a non-restoring division algorithm wherein two quotient bits are generated simultaneously during each addition cycle. A multiple of the divisor to be subtracted from four times the remainder for the succeeding cycle is selected concurrently with the remainder developed as the result of subtraction. A table and decoder are used to examine the magnitudes of the remainder in the divisor to predict this multiplication factor which may also be developed tentatively into the two bit quotient. A correction may be made to the tentative quotient as a result of the adder operation, the corrected quotient being entered into the quotient register. The patent does not disclose a solution to the problem of dealing with the ultimate remainder, detecting whether a result is exact or inexact, or rounding the final quotient.

It is a principal object of the present invention to provide an apparatus for floating point divide operations, wholly in conformance with ANSI/IEEE Standard No. 754-1985.

It is a further object of the present invention to provide an apparatus for performing floating point division operations wherein the quotient result may be properly rounded in accordance with ANSI/IEEE Standard No. 754-1985, and wherein the "inexact result" condition is properly indicated in conformance with the standard.

It is a further object of the present invention to provide an apparatus for holding multipliers which, when applied to divisors, accurately produces a quotient and remainder result which conforms to the standard.

SUMMARY OF THE INVENTION

The invention includes a plurality of registers for holding a divisor, dividend, and partial dividends, coupled to a single carry-save adder and carry-propagate adder, with a particular method for sequencing the divisor and in order to produce two quotient bits for each iteration. To produce two quotient bits for each iteration, the multiples of the divisor that are required are the zero, $\frac{1}{2}$, $\frac{3}{4}$, 1, and 3/2 multiples. The $\frac{3}{4}$ and 3/2 multiples of the divisor are effectively generated by properly gating the $\frac{1}{2}$ and 1 multiples to the carry-save adder. Since the carry-save adder can accommodate three operands, this allows a divide iteration which only requires the divisor and dividend or partial dividend to be stored in a register. The sequencing method includes the addition or subtraction of the multiples of the divisor to produce a partial dividend that is shifted leftward by two positions for each iteration, to produce two quotient bits for each iteration. The higher order bits of the divisor and the higher order bits of the dividend, or partial dividend, are decoded to select the multiple of the divisor for the next iteration. The quotient bits selected depend upon whether the partial dividend at the start of an iteration is true or complement, whether the partial dividend at the end of the iteration is true or complement, and the particular divisor multiple that was selected.

The multiples are preselected by implementing a special divide algorithm which tests all possible multiples which are usable within the physical constraints imposed by the divide circuits, and which produce results which conform to the requirements of ANSI/IEEE Standard 754-1985. The preselected multiples are stored in a multiple selector logic circuit in the form of a matrix tabulation which is accessible by signal lines representing particular 3-bit combinations of dividend and divisor values.

DESCRIPTION OF THE PREFERRED EMBODIMENT

Figure 1:
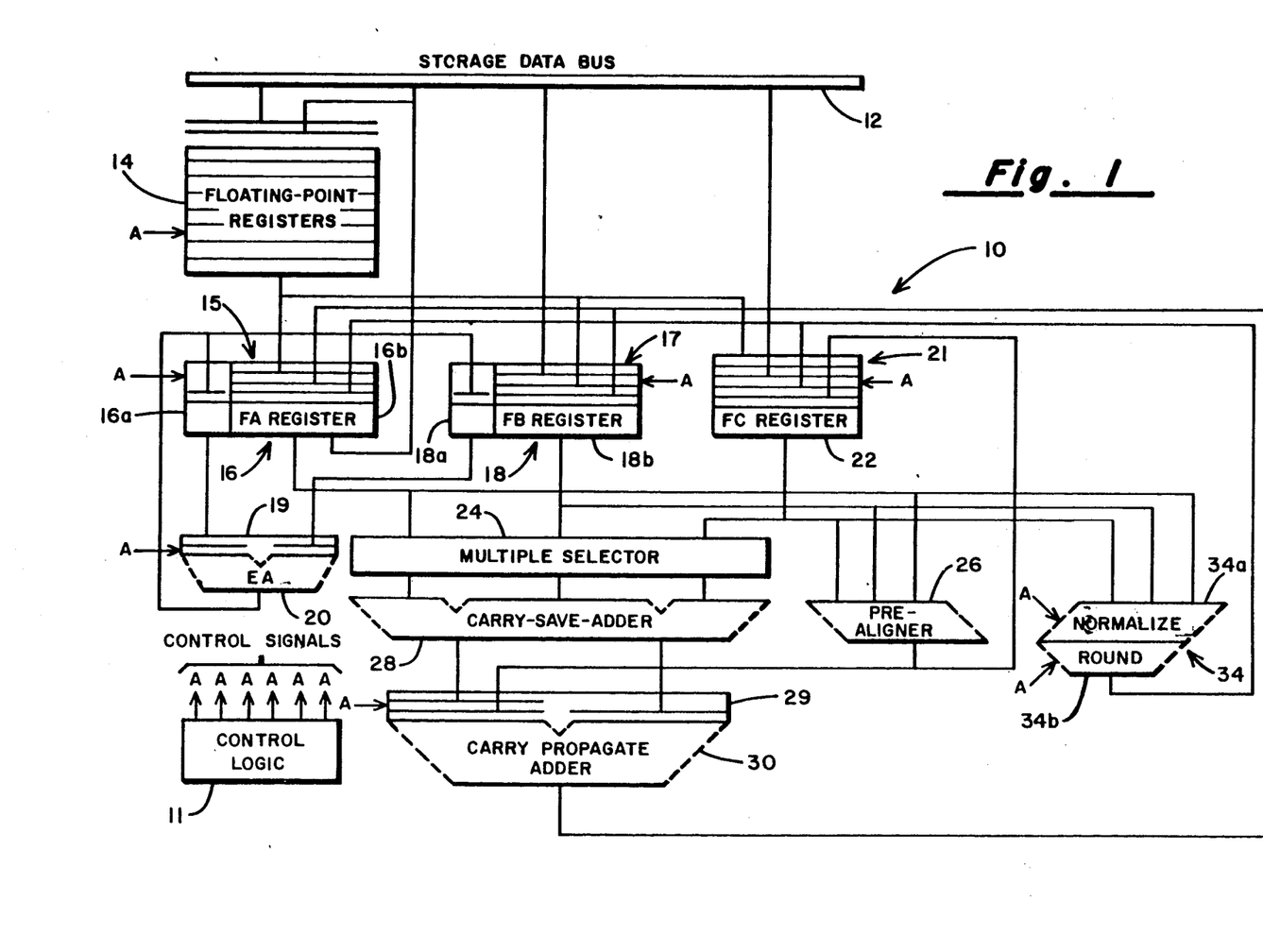
FIG. 1 shows a block diagram of a floating point arithmetic circuit used with the present invention.

Referring first to FIG. 1, there is shown a block diagram of the floating point arithmetic circuit which is used in conjunction with the present invention. The execution of floating point arithmetic utilizes this circuit because of the specific algorithms which must be performed to determine the proper results. This circuit presumes that the floating point numbers have been prearranged format, where the most significant bit represents the sign of the floating point number, and wherein a group of the next-most significant bits represent the exponent of the floating point number, and wherein the remaining bits represent the fraction value of the number; i.e., the fraction value presuming that the binary point is placed at the left-most end of the fraction value. In the case of floating point arithmetic utilizing single precision calculations wherein the size of the number is 32 bits, the sign bit is presumed to be bit 0, the exponent bits are 1-8, and the fraction value bits are 9-31. In the case where the floating point arithmetic is accomplished utilizing double precision numbers, the sign bit is bit 0, the exponent bits are 1-11, and the fractional value bits are 12-63. In addition to the foregoing identified bits, the hardware register and logic associated with FIG. 1 include four additional bits; the I bit occupies the most significant position in the fraction field, and the G, R and S bits respectively occupy the least significant bit positions in the fraction field.

Floating point operands cannot be added to or subtracted from each other unless their exponents are equal. This requires that their exponents be compared, and the operand fraction with the smaller exponent be shifted the amount of the exponent difference. The fractions can then be added or subtracted with the larger exponent as the result exponent. Multiplication of floating point operands requires that the exponents be added and the fractions multiplied. Division of floating point operands requires that the divisor exponent be subtracted from the dividend exponent and the dividend fraction be divided by the divisor fraction.

The floating point arithmetic circuit of FIG. 1 can support both single and double precision arithmetic operations. It is designed to support a floating point add or subtract operation, a 4-bit floating point multiply operation, or a 2-bit floating point divide operation.

The floating point arithmetic circuit 10 of FIG. 1 utilizes a storage data buss 12 for receiving and transmitting data from other sources, such as a data processing system or the like. Information received over data storage buss 12 may be transmitted into a plurality of floating point registers 14. In the preferred embodiment there are eight floating point registers 14, each adapted to hold the floating point operands and the results of floating point operations. Floating point registers 14 may transmit information to an FA register 16, an FB register 18, or an FC register 22. FA register 16 may also transmit information back to floating point registers 14.

The FA register 16 is a destination register for data from the floating point registers 14, and is the source register for data being transmitted to the floating point registers 14. The FA register 16 is also the source register for data which may be transferred to a memory via storage data buss 12, and it is a destination register for data transmitted from the carry-propagate adder 30, the exponent adder 20, and from the normalize-round circuit 34. The FA register 16 has outputs to the multiple selector 24, the prealigner circuit 26, the normalize-round circuit 34, and the exponent adder 20. The FA register 16 contains the second operand for add, subtract, compare, multiply and divide operations. FA register 16 has a section 16a for holding the exponent of the floating point number, and a section 16b for holding the fraction portion of the floating point number.

In order to selectively control which of the plurality of inputs to the FA register 16 are to be gated into the register, the FA register 16 has an input multiplexer circuit 15 associated therewith. Multiplexer circuit 15 provides for the selective gating of the various inputs into register 16, under control of an activation signal A. Other registers in the floating point arithmetic circuit 10 have similar multiplexer input controls.

A control logic circuit 11 generates all of the activation signals required for data interchange and processing operations within floating point arithmetic circuit 10. Control logic circuit 11 has a plurality of control signal outputs, designated A, each of which serve as control inputs to various circuits and registers. It is well within the skill of the art to understand the need and design for a control logic circuit 11, as well as the activation signals A which are required for the operation of floating point arithmetic circuit 10; accordingly, a detailed presentation of these circuits and signals is not required herein.

The FB register 18 is a destination register for data received from the storage data buss 12, the floating point registers 14, and is also a destination register for data from the carry-propagate adder 30, and from the normalize-round circuit 34. It has outputs to the multiple selector 24, the prealigner circuit 26, and the exponent adder 20. The FB register is used to contain the first operand for the add, subtract, compare and divide operations; it also contains the intermediate result of the add, subtract and multiply operations. The FB register 18 has a section 18a for containing the exponent value of the floating point number, and a section 18b for containing the operand portion of the floating point number, and has an input multiplexer circuit 17 for gating data into the register under control of activation signals from control logic circuit 11.

The FC register 22 is a destination register for data from memory via storage data buss 12, and a destination register for data from the carry-propagate adder 30 and from the normalize-round circuit 34. It is also the destination register from the floating point registers 14. The FC register 22 has outputs to the multiple selector 24, the prealigner circuit 26, and the normalize-round circuit 34. The FC register 22 is used to contain the first operand of the multiply operation, and it is the destination register for the result of a divide operation. An input multiplexer circuit 21 controls the gating of data into FC register 22, under control of activation signals from control logic circuit 11.

The exponent adder 20 is a 13-bit adder circuit that is used for exponent arithmetic. It handles the exponent calculations for either single or double precision exponents. The exponent adder is a source for data transmitted to FA register section 16a, and FB register section 18a. The exponent adder 20 has an input multiplexer circuit 19.

The prealigner circuit 26 is used to pre-shift the fraction with the smaller exponent for the add and subtract operation, which is necessary to make the floating point operand exponents equal prior to an add or subtract operation. The prealigner circuit 26 has the capability to shift a floating point fraction right from 0 to 55-bit positions, depending upon whether single or double precision arithmetic is being performed. The prealigner circuit 26 has an output to the carry-propagate adder 30, and to the FC register 22.

The multiple selector 24 is a logic circuit which generates multiples of the multiplicand for the multiply operation, and multiples of the divisor for the divide operation. For the divide operation, the multiples are decoded from the high-order bits of the dividend, or partial dividend, and of the divisor. The complement of the operand may be generated by the multiple selector when necessary. The multiple selector 24 receives data from the FA register 16, the FB register 18, and the FC register 22. The multiple selector 24 has outputs to the carry-save adder 28. The multiple selector 24 contains a logic circuit which embodies a matrix of multipliers potentially usable as divisor multipliers during each iteration of a divide sequence. These multipliers are selected by access lines which are activated by decoding the upper three bits of the divisor quantity and the upper three bits of the dividend or partial dividend quantity for each iteration. Although the multipliers are embodied in physical form in the form of a semiconductor logic matrix or programmable read-only memory chip, they are represented herein in tabular form for ease of reference and understanding. The selection of appropriate multipliers is critical to the operation of the floating point divider circuit, for they must not only provide a correct quotient result, but also must provide a correct indication of the remainder which is used in the rounding operation of the divide sequence. The present invention relates to the selection of these multipliers, and particularly to the selection of multipliers which conform to the ANSI/IEEE Standard 754-1985.

The carry-save adder 28 will permit three operands to be added together at the same time. This permits the use of a divide algorithm which generates two quotient bits per iteration The carry-save adder 28 receives data from the multiple selector 24, and transmits data to the carry-propagate adder 30.

The carry-propagate adder 30 is a 57 bit adder, and has an input from the carry-save adder 28 for generating the partial product of a multiply operation or the partial dividend of a divide operation. The carry-propagate adder circuit 30 may also receive inputs from the prealigner circuit 26, the FA register 16, and the FB register 18. The carry-propagate adder has an output connection to the FA register 16 and the FB register 18. An input multiplexer circuit 29 controls the gating of data into carry-propagate adder 30, under control of activation signals A from control logic circuit 11.

The normalize-round circuit 34 includes a normalize circuit 34a which is used to normalize the results of a floating point operation. For example the result of a multiply operation may require a left-shift of one bit in order to normalize the fraction, an the result of an add or subtract operation may require a left-shift of up to 54-bit positions. The normalize-round circuit 34 also includes a round circuit 34b, which contains an incrementor circuit, for use in certain rounding operations, where the result may have to be incremented by a value of 1 in the low-order bit position.

When the circuit of FIG. 1 is utilized for floating point divide operations, the divisor is placed in the FA register 16 and the dividend is placed in the FB register 18. To divide floating point operands, the exponent of the divisor, found in register section 16a, is subtracted from the exponent of the dividend, found in register section 18a, utilizing the exponent adder 20. The fractional dividend, found in register section 18b, is divided by the fractional divisor, found in register section 16b. The fraction divide algorithm requires a non-restoring uniform shift of two bits during each iteration. It requires the correct multiples of the divisor to be placed in the multiple selector 24, to produce a partial dividend that can be shifted left by 2-bits for each iteration, and which will produce two quotient bits for each iteration. The quotient ultimately will appear in the FC register 22, and the partial dividends will be developed in register section 18b during the operation.

In operation, the method involves a series of subtractions. Based on the high-order bits of the dividend and the divisor, a multiplier is chosen. The divisor is multiplied by this multiplier, and the product is subtracted from the dividend, producing a partial remainder. The partial remainder is shifted left by 2-bits to become the next partial dividend. Next, based on the high-order bits of the partial dividend and the divisor, another multiplier is chosen. Again, the divisor is multiplied by the chosen multiples, subtracted from the partial dividend to produce the next partial remainder. These steps are repeated, with each iteration producing 2-bits of the quotient, based on the multiplier chosen and the sign of the partial remainder before and after the iteration.

After the last iteration, the partial remainder is examined to determine whether it is equal to zero. If it is not zero, the result of the division operation is inexact. In this situation a rounding sequence is normally executed which makes a determination, according to specific predefined rules, whether the quotient is to be rounded by incrementing the quotient value by 1-bit. In this situation, under the applicable ANSI/IEEE Standard No. 754–1985, the inexact result condition is signaled by setting a particular bit in a register to a "1." The purpose of this procedure is to provide an indication that an inexact result was obtained, for consideration by the software should such consideration be deemed necessary.

It has been determined that under certain prior art circumstances the inexact result condition is incorrectly asserted, and the quotient is rounded up when it should not be. The root of the problem occurs when the remainder is not zero, even though the quotient derived from the divide iteration is exact. Each iteration of the divide sequence toward the end of the division operation produces 00 for quotient bits, and the same partial remainder. Under the circumstance, the remainder is not zero because of the multiplier that was chosen during the divide iteration, although the multiplier was chosen properly according to the criterion set up in the prior art non-restoring divide algorithm. It is believed that the basis for this problem is that the non-restoring divide algorithm was designed to produce correct quotient bits, but never took into specific consideration the requirement to determine if a quotient was exact or inexact. The distinction between an exact and an inexact result is required by the ANSI/IEEE Standard, but has not heretofore been required by other standards. Therefore, the need for a division operation which produces an exact quotient, and always produces a partial remainder of zero, did not exist until the standards set forth such a requirement.

The criterion for selecting a multiplier, according to the prior art 2-bit non-restoring division algorithm, is to choose the multiplier so that the magnitude of the resulting partial remainder is small enough that two high-order bits can be ignored without affecting the value of the partial remainder. If the partial remainder is positive, the two high-order bits must be 00. If the partial remainder is negative, the two high-order bits must be 11. This is true, because one of the steps in the algorithm is to shift the partial remainder left 2-bits on each iteration, and no significant bits can be lost.

The present invention adds another criterion, and further constrains the choice of multipliers, to avoid the failing situation described above. This situation is a partial remainder that repeats, is not zero, but produces 00 for the quotient bits. A repeating partial remainder of zero is acceptable, because that indicates an exact result. An iteration which produces a repeating partial remainder and quotient bits that are non-zero is also acceptable, because in this case the result is truly non-exact.

In examining each iteration of the divide algorithm, it is apparent that each iteration satisfies the following equation:

$$R = D - MV$$

Where R is the partial remainder at the end of the iteration;

Where D is the partial remainder at the beginning of an iteration;

Where M is the factor to be multiplied by the divisor and subtracted from the beginning partial remainder, otherwise known as the multiplier; and Where V is the divisor.

The foregoing equation forms the partial remainder R. The partial remainder is then shifted left by 2-bits, to prepare for the next iteration. This shifted value of R becomes the D for the next iteration. It should be noted that V is always a positive number, whereas the value for R and D may be positive or negative. In cases where D is negative, the multiplier M is selected to be a negative number, so that the equation always produces a difference value R, as the difference between D and MV.

The implementation of the divide algorithm utilizes the hardware shown in FIG. 1, to select the multiplier M as a function of the three most significant bits of the dividend D and the divisor V. At the time the divide algorithm is designed, a set of possible candidates for M is selected and is checked individually against the criteria of the divide algorithm; this involves computing a value R, using all combinations of D and V, and using various candidates for M. If the sole criterion of the divide algorithm is that the partial remainder which results from each iteration can be shifted 2-bits left without losing any significant bits, this is equivalent to the requirement that the partial remainder produced by each iteration fall within the following range:

$$-2 < \text{ or } = R < +2$$

Figure 2:
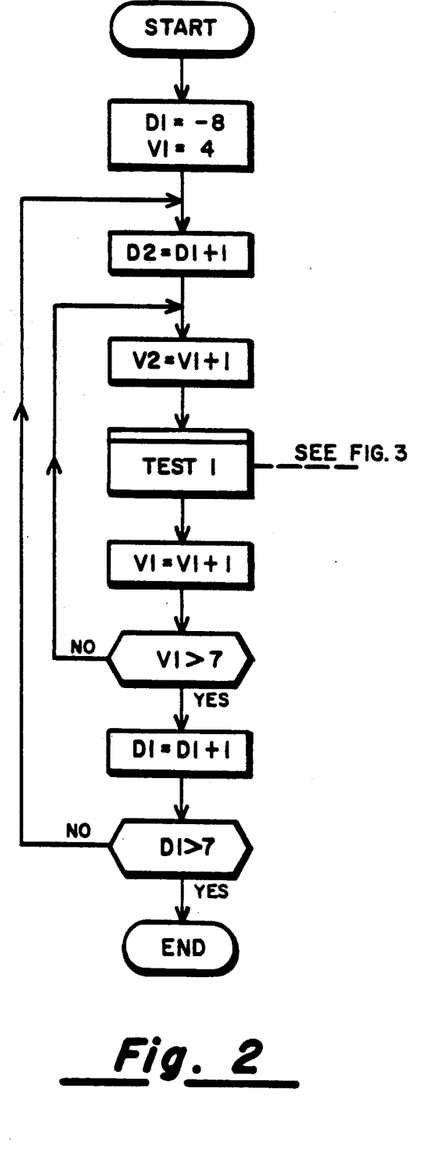
FIG. 2 shows a flow chart of an algorithm known in the prior art for selecting the divisor multipliers which satisfy the criterion of insuring that the partial remainder produced during any iteration can be left-shifted without loss of significance.
Figure 3:
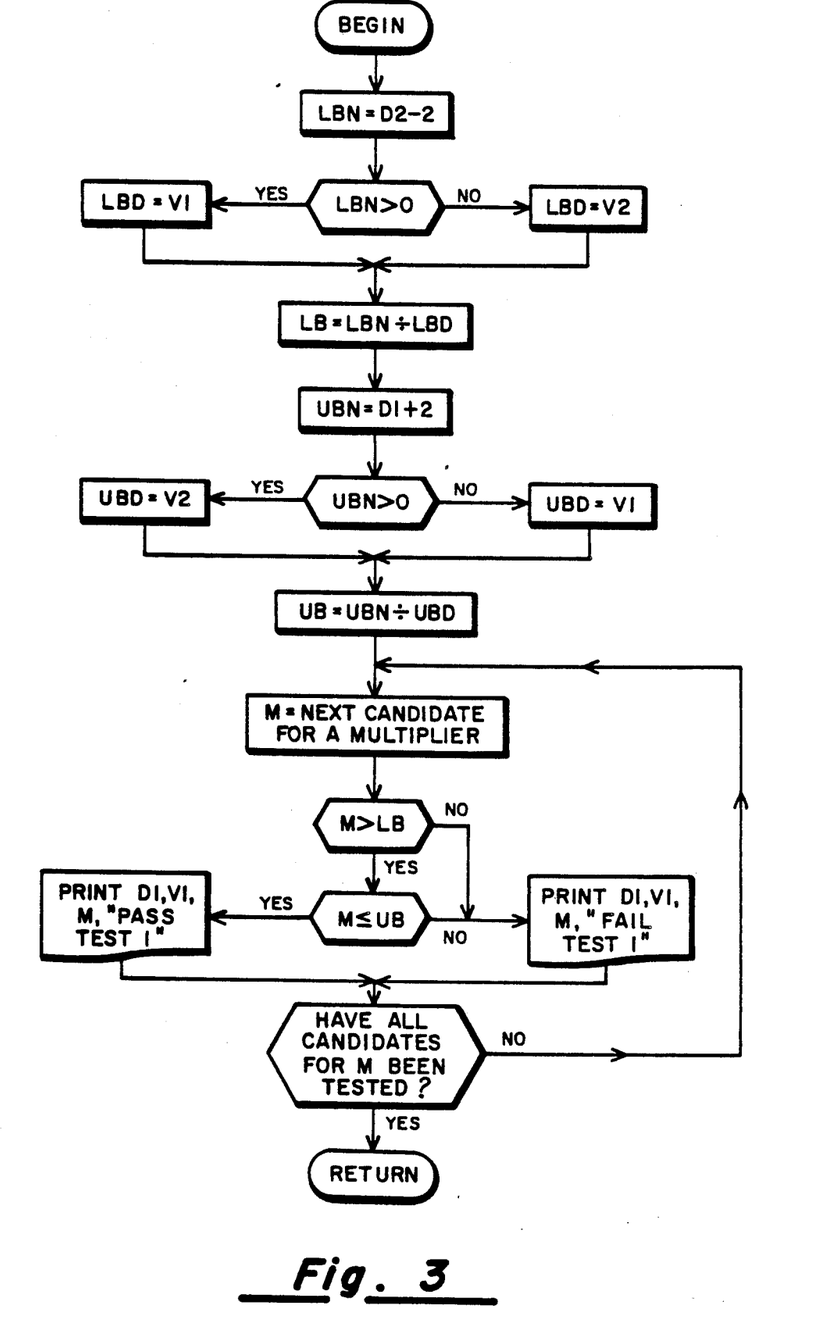
FIG. 3 shows a further flow chart related to FIG. 2.

FIGS. 2 and 3 show flow charts of the algorithm which was used in the prior art in order to produce candidates for the value of multiplier M. The following definitions apply to the terms illustrated in these figures:

D1 equals the most negative value of D in an interval of possible values for D.

D2 equals the most positive value of D in an interval of possible values for D.

V equals the divisor.

V1 equals the most negative value of V in an interval of possible values for V.

V2 equals the most positive value of V in an interval of possible values for V.

M equals the factor to be multiplied by the divisor and subtracted from the partial remainder D (this is called the multiplier).

LB equals the lower bound for an acceptable value of M.

UB equals the upper bound for an acceptable value of M.

UBD, LBD equals the upper and/or lower bound of the denominator.

UBN, LBN equals the upper and/or lower bound of the numerator.

The algorithms illustrated in FIGS. 2 and 3 produce a number of candidate values for M which pass the test, including value of M of zero, $\frac{1}{2}$, $\frac{3}{4}$, 1, 3/2, −1/2, −$\frac{3}{4}$, −1, −3/2 and −2. The foregoing candidates are chosen because each involves a relatively simple arithmetic manipulation of a binary number, such as right or left shifting, to produce fractional quantities or powers of 2, or shifting with a simple addition of another shifted value to produce a sum of two numbers, which can be relatively easily developed in standard computer hardware. Applying these candidate values of M to the multiple selector circuit 24 of FIG. 1, and more particularly to the logic circuit which is accessible during the divide iterations, leads to a logic circuit which may be represented in the form shown in Table 1. Table 1 shows a matrix of M values, wherein each value of M is found at the intersection of a particular divisor value and a particular dividend value, represented either as a true dividend or a complement dividend value. The physical logic circuit matrix is designed to produce the particular multiplier M upon simultaneous activation of signal lines representative of the particular divisor and dividend values.

TABLE 1

| TRUE DIVIDEND | DIVISOR | | | | COMPLEMENT DIVIDEND | DIVISOR | | | |
|---|---|---|---|---|---|---|---|---|---|
| | 100 | 101 | 110 | 111 | | 100 | 101 | 110 | 111 |
| 000 | 0 | 0 | 0 | 0 | 000 | 3/2 | 3/2 | 1 | 1 |
| 001 | 0 | 0 | 0 | 0 | 001 | 3/2 | 1 | 1 | 1 |
| 010 | 1/2 | 1/2 | 1/2 | 1/2 | 010 | 1 | 1 | 1/2 | 1/2 |
| 011 | 1/2 | 1/2 | 1/2 | 1/2 | 011 | 1 | 1 | 1/2 | 1/2 |
| 100 | 1 | 1 | 1/2 | 1/2 | 100 | 1/2 | 1/2 | 1/2 | 1/2 |
| 101 | 1 | 1 | 1/2 | 1/2 | 101 | 1/2 | 1/2 | 1/2 | 1/2 |
| 110 | 3/2 | 1 | 1 | 1 | 110 | 0 | 0 | 0 | 0 |
| 111 | 3/2 | 3/2 | 1 | 1 | 111 | 0 | 0 | 0 | 0 |

As has been hereinbefore described, the foregoing Table 1, when reduced to a semiconductor chip for the selection of values for M, has provided complete and accurate results for divide calculations in nearly all cases. However, certain divisors and dividends have been discovered to produce inaccurate results, wherein a quotient was incorrectly incremented, or an incorrect indication of an inexact result has occurred. These cases involve numbers where the quotient bits produced near the end of the division iterations were 00, and the partial remainder remained unchanged. The problem has come to light in attempting to design a divide circuit which conforms in all cases to the ANSI/IEEE Standard.

The present invention sets forth a new and additional criterion for choosing the multiplier M. This new criterion is intended to be used in addition to the old criterion, and not to replace the old criterion. The new criteria can be stated as follows: For iterations producing zeros for quotient bits, but not a zero for the partial remainder, the multiplier M should be chosen such that the following equation is met:

$$R \neq D/4$$

The foregoing criterion is chosen to avoid the situation that occasionally occurs, wherein the ANSI/IEEE standard which has been hereinbefore described is not followed. Applying the foregoing inequality to the earlier-described iteration equation leads to the following calculations:

$$R = D - MV$$

$$D - MV \neq D/4$$

$$MV \neq D - (D/4)$$

$$MV \neq (\tfrac{3}{4})D$$

$$M \neq (\tfrac{3}{4})D/V$$

To meet the foregoing inequality, for all values of D and V within the range of interest, either of the following equations is met:

$$M < (\tfrac{3}{4})D/V, \text{ or}$$

$$M > (\tfrac{3}{4})D/V$$

Figure 4:
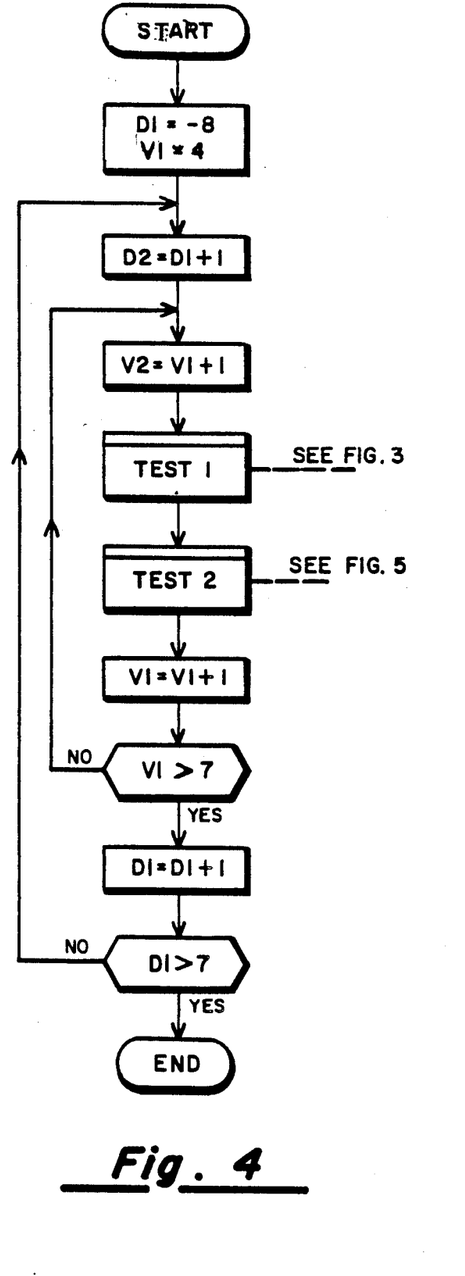
FIG. 4 shows a flow chart of an algorithm of the first type, further insuring that the selected multipliers will produce a correct quotient and indication of an inexact result when necessary.
Figure 5:
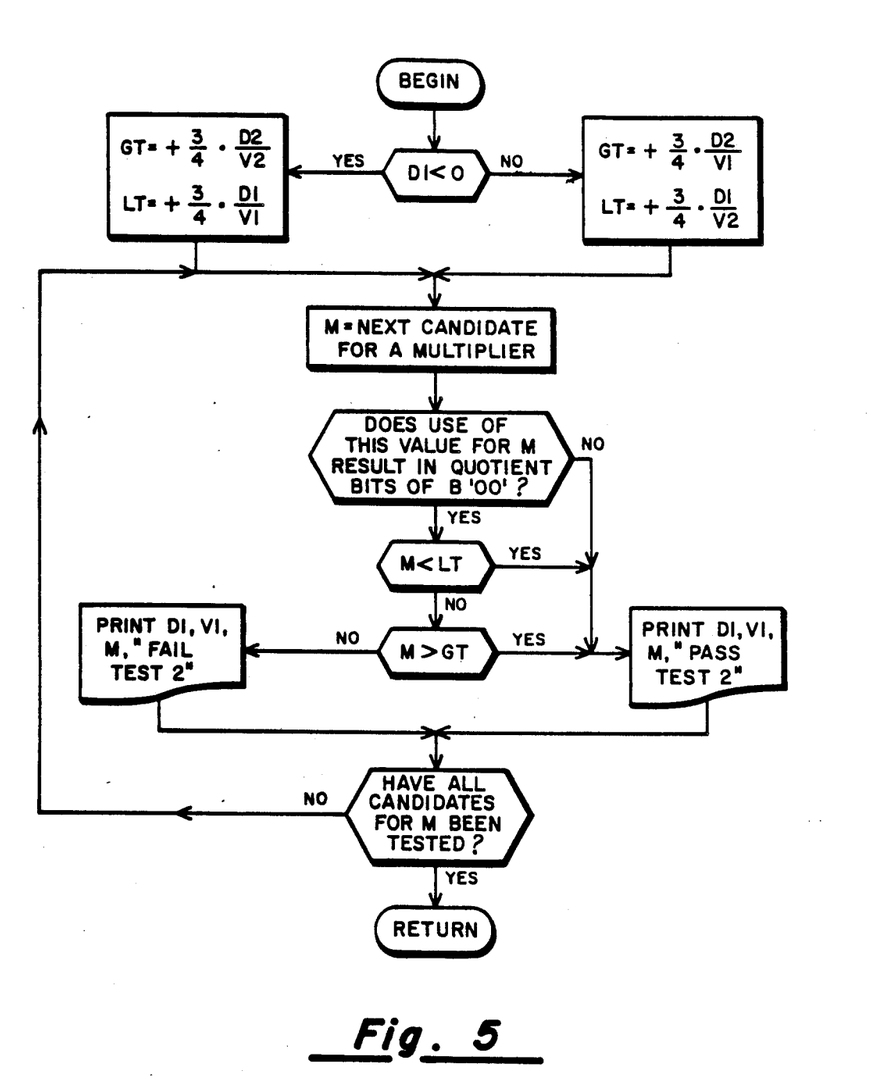
FIG. 5 shows a further flow chart relating to FIG. 4.

FIGS. 4 and 5 show a flow chart for an algorithm to test for candidate values for M according to this new criterion. The new criterion is incorporated into "Test 2," which is shown in FIG. 4 and is shown in greater detail in FIG. 5. The following definitions apply to the terms which are illustrated in FIGS. 4 and 5:

D1 = the most negative value of D in an interval of possible values for D;

D2 = the most positive value of D in an interval of possible values for D;

V1 = the most negative value of V in an interval of possible values for V;

V2 = the most positive value of V in an interval of possible values for V.

LB = the lower bound for an acceptable value of M.

UB = the upper bound for an acceptable value of M.

LT = $\tfrac{3}{4}$ D1/V1 (negative D) or = $\tfrac{3}{4}$ D1/V2 (positive D).

GT = $\tfrac{3}{4}$ D2/V2 (negative D) or = $\tfrac{3}{4}$ D2/V1 (positive D).

Applying the foregoing definitions to the inequality equation above, the following results are achieved for negative values of D:

$$M < (\tfrac{3}{4})D1/V1, \text{ or}$$

$$M > (\tfrac{3}{4})D2/V2$$

Applying the foregoing definitions to positive values for D, the following results are achieved:

$$M < (\tfrac{3}{4})D1/V2, \text{ or}$$

$$M > (\tfrac{3}{4})D2/V1$$

Selecting the multiplier M according to the foregoing rules produces divide algorithms which always satisfy the standards set forth in ANSI/IEEE Standard No. 754–1985, regardless of the initial values for the divisor and dividend.

When the acceptable values of M which are determined as a result of applying this new criterion, the foregoing values for M shown in Table 1 are in large part preserved. However, it is revealed that one of the M values must be changed in order to meet the new criterion, and the resulting circuit logic matrix is represented as shown in Table 2. It is apparent that the multiplier M which is retrieved upon inspection of a complement dividend value of "010" and a divisor value of "110" must be changed to a multiplier M = 1. This change of value for M in this instance then produces quotient and remainder values which are entirely consistent with the ANSI/IEEE Standard.

Table 2 represents the electrical characteristics of a semiconductor chip which may be utilized in multiple selector 24 for deriving the correct multiple M for use in each divide iteration. In order to complete the divide operation, the quotient bits for each iteration must be selected, which is accomplished by another circuit logic chip which is preprogrammed to provide quotient bit values as an output, as a function of the values calculated during the iteration.

TABLE 2

| TRUE DIVIDEND | DIVISOR 100 | 101 | 110 | 111 | COMPLEMENT DIVIDEND | DIVISOR 100 | 101 | 110 | 111 |
|---|---|---|---|---|---|---|---|---|---|
| 000 | 0 | 0 | 0 | 0 | 000 | 3/2 | 3/2 | 1 | 1 |
| 001 | 0 | 0 | 0 | 0 | 001 | 3/2 | 1 | 1 | 1 |
| 010 | ½ | ½ | ½ | ½ | 010 | 1 | 1 | 1 | ¾ |
| 011 | ½ | ½ | ½ | ½ | 011 | 1 | 1 | ¾ | ¾ |
| 100 | 1 | 1 | ¾ | ¾ | 100 | ½ | ½ | ½ | ½ |
| 101 | 1 | 1 | ¾ | ¾ | 101 | ½ | ½ | ½ | ½ |
| 110 | 3/2 | 1 | 1 | 1 | 110 | 0 | 0 | 0 | 0 |
| 111 | 3/2 | 3/2 | 1 | 1 | 111 | 0 | 0 | 0 | 0 |

Table 3 shows a table for selecting a pair of quotient bits as a function of the partial dividend value and the multiple select. The quotient bits which are selected depend upon three conditions:

(1) whether the partial dividends at the start of the iteration is true or complement;

(2) whether the partial dividends at the end of the iteration is true or complement;

(3) which multiple was used during the iteration.

For example, if the partial dividend at the start of the iteration was true, and the partial dividend at the end of the iteration was true, and the ½ times multiple was used during the iteration, the quotient bits selected will be 01. In the case when the ¾ times multiple is used during the iteration, three quotient bits are generated. These three quotient bits are all valid, and the third bit must be used in place of the high-order bit that is generated on the next iteration.

TABLE 3

| PARTIAL DIVIDEND | RESULT | MULTIPLIER USED 3/2 | 1 | ¾ | ½ | 0 |
|---|---|---|---|---|---|---|
| T | T | 11 | 10 | 011 | 01 | 00 |
|   | C | 10 | 01 | 010 | 00 | — |
| C | T | 01 | 10 | 101 | 11 | — |
|   | C | 00 | 01 | 100 | 10 | 11 |

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. In a floating point divide circuit of the type using a 2-bit, non-restoring division method, the improvement comprising a multiplier selection circuit having means for selecting a divisor multiple as a function of the most significant bits of the divisor and dividend, said multiplier selection circuit further comprising a semiconductor circuit having a selectable matrix of signals representative of possible divisor multipliers, none of said divisor multipliers being equal to three-fourths the value of the dividend divided by the divisor for all values of dividend and divisor within the range of most significant bits of interest.

2. An apparatus for producing divisor multiples in a floating point arithmetic circuit, comprising a semiconductor circuit having a matrix of signal-producing cells therein, each of said cells being connected to sense the most significant bits of dividend registers and divisor registers, and each of said cells having means for producing a signal representative of a divisor multiplier in response to signals representative of the most significant bits of dividends and divisors, said signals representative of divisor multipliers further comprising signals representing divisor multipliers not equal to ¾ D/V, where D and V respectively are all dividend and divisor values within the range of most significant bits to which said input selection circuit responds.

3. The apparatus of claim 2, wherein said divisor multipliers further comprise the values 0, ½, ¾, 1 and 3/2.

4. An apparatus for producing divisor multiples in a floating point arthmetic circuit, comprising a semiconductor circuit having a matrix of signal-producing cells therein, each of said cells connected to an input selection circuit and having means for producing a signal representative of a divisor multiple to said input selection circuit, said matrix of signal-producing cells being responsive to signals representative of most significant bits of dividends and divisors; said matrix of signal-producing cells being constructed to produce specific divisor multiples according to the following combinations of divisors and dividends:

| TRUE DIVIDEND | DIVISOR 100 | 101 | 110 | 111 | COMPLEMENT DIVIDEND | DIVISOR 100 | 101 | 110 | 111 |
|---|---|---|---|---|---|---|---|---|---|
| 000 | 0 | 0 | 0 | 0 | 000 | 3/2 | 3/2 | 1 | 1 |
| 001 | 0 | 0 | 0 | 0 | 001 | 3/2 | 1 | 1 | 1 |
| 010 | ½ | ½ | ½ | ½ | 010 | 1 | 1 | 1 | ¾ |
| 011 | ½ | ½ | ½ | ½ | 011 | 1 | 1 | ¾ | ¾ |
| 100 | 1 | 1 | ¾ | ¾ | 100 | ½ | ½ | ½ | ½ |
| 101 | 1 | 1 | ¾ | ¾ | 101 | ½ | ½ | ½ | ½ |
| 110 | 3/2 | 1 | 1 | 1 | 110 | 0 | 0 | 0 | 0 |
| 111 | 3/2 | 3/2 | 1 | 1 | 111 | 0 | 0 | 0 | 0 |

* * * * *